United States Patent [19]

Ueno et al.

[11] Patent Number: 4,806,378
[45] Date of Patent: Feb. 21, 1989

[54] PRODUCTION OF FROZEN SURIMI

[75] Inventors: Ryuzo Ueno; Yatsuka Fujita, both of Nishinomiya, Japan

[73] Assignee: Ueno Seiyaku Kabushiki Kaisya, Japan

[21] Appl. No.: 930,743

[22] Filed: Nov. 14, 1986

[30] Foreign Application Priority Data

Nov. 20, 1985 [JP] Japan ............................ 60-261917

[51] Int. Cl.$^4$ ............................................. A23L 1/325
[52] U.S. Cl. ............................................. 426/643
[58] Field of Search ............................ 426/643, 104

[56] References Cited

U.S. PATENT DOCUMENTS

| | | | |
|---|---|---|---|
| 4,168,323 | 9/1979 | Inamine et al. | 426/643 |
| 4,320,153 | 3/1982 | Ueno et al. | 426/643 |
| 4,464,404 | 8/1984 | Ueno et al. | 426/643 |

FOREIGN PATENT DOCUMENTS

| | | | |
|---|---|---|---|
| 19162 | 2/1976 | Japan | 426/643 |
| 86165 | 7/1976 | Japan | 426/643 |
| 183674 | 10/1984 | Japan | 426/643 |

*Primary Examiner*—Arthur L. Corbin
*Attorney, Agent, or Firm*—Wegner & Bretschneider

[57] ABSTRACT

The present invention provides a method of production of frozen surimi, from which a surimi (minced fish meat containing additives) and kamaboko (fish cake) having an excellent elasticity with softness and whiteness is obtained. In the present invention, as washing water for minced fish meat, water containing water soluble calcium or magnesium salts is used, after which the washed fish meat is dehydrated and surface active agents are added to the dehydrated minced fish meat.

5 Claims, No Drawings

PRODUCTION OF FROZEN SURIMI

BACKGROUND OF THE INVENTION

The present invention relates to a method of production of frozen minced fish meat containing additives (referred to as "frozen surimi" hereinafter).

In a conventional method, frozen surimi is produced by washing minced fish meat obtained from raw fish meat, such as Walleye pollack, with fresh water two or more times. The minced fish meat is then washed with water containing a small amount of salts and, if necessary, the black skin is removed through a refiner. The fish meat is dehydrated through use of a filter press, screw press or the like, and sugars or sugar alcohols and polyphosphates and the like are added. The fish meat is then packed, frozen and held at $-20°$ to $-30°$ C.

According to the above method, the added sugars, sugar alcohols and phosphates denaturate the protein in frozen surimi upon freezing, so as to make it impossible to store frozen surimi for long periods of time.

However, when the minced fish meat is washed with water during production of the frozen ground surimi, especially in winter, the minced fish meat is liable to hydrate with an excess amount of water. This excess hydration causes the fish meat to swell and makes the dehydration difficult. In addition, a portion of the myofibrillar proteins in the fish meat dissolves in the water. In order to prevent such a phenomenon, a small amount of salts has been added to the wash water, but insufficient dehydration is thereby achieved. This results in a poor yield due to the removal of fish meat protein with water.

In order to solve the above problems, it was proposed to use a final wash water containing calcium salts and/or magnesium salts.

However, in such a method it is difficult to delicately control the dehydration of the washed minced fish meat. For example, the amount of water and the concentration of salts to be added to a given amount of dehydrated minced fish meat will vary according to the condition of the fish meat (which is changed according to the season), size of the fish, freshness and so on. Additionally, due to the fact that the solubility of the myofibrillar protein is reduced by the addition of calcium salts or magnesium salts, some kinds of fish meat give hard paste products which can not be regenerated. Therefore, in spite of the recognized dehydrating effect of calcium salts and magnesium salts, these salts have not been actually used because of these difficulties in use.

As a compromise method, it was proposed in Japanese patent application No. 7421-1985 and Japanese patent application No. 172379/1985 that sodium salts, such as NaCl or $NaHCO_3$, be added with calcium salts and/or magnesium salts to the wash water to weaken the dehydrating action of the latter salts.

On the other hand, it was proposed that in order to improve the quality of the frozen surimi that surface active agents be added. For instance, there is proposed in Japanese Patent KOKAI No. 89061/1979 that the whiteness and brightness of frozen surimi is improved by the addition of monoglycerides to prevent freezing denaturation of the protein through freezing. Further, it is proposed in Japanese Patent KOKAI Nos. 9350/1978 and 133667/1978 that the elasticity and whiteness of frozen surimi is improved by the co-use of sugars and sugar alcohols with monoglycerides. However, it has been unexpectedly found that the water-solubility of the hard dehydrated minced meat obtained with calcium salts- or magnesium salts-containing water is increased by the addition of surface active agents and glycerides, so as to soften the minced meat. However, the prior art does not suggest that surface active agents or glycerides are effective for softening frozen surimi hardened by excess dehydration or the release of myofibrillar protein into water.

SUMMARY OF THE INVENTION

The present invention relates to a method of production of frozen surimi, which comprises first washing minced meat with an aqueous solution of water soluble calcium salts and/or magnesium salts, second adding surface active agents for food and/or fatty compounds for food to the raw surimi after dehydration (referred to as "dehydrated minced fish meat" hereinafter) and freezing the obtained dehydrated minced fish meat.

According to the present invention, the dehydration of the washed minced fish meat is made easy and the release of myofibrillar protein of the washed minced fish meat into the washing water is reduced. The surimi, the nature of which is changeable according to the kind of fish, freshness and the like, is thereby softened, and in particular hardness, which is caused by the over-dehydration and has been considered impossible to reverse can be adjusted to a desirable range.

DETAILED DESCRIPTION OF THE INVENTION

The present invention relates to a method of production of frozen surimi which makes the dehydration of washed minced fish meat easy, reduces the release of myofibrillar protein into water, and makes it possible to control the hardness of the surimi and the surimi based product produced therefrom.

The present invention provides a method of production of frozen surimi, which comprises washing minced fish meat with water containing calcium salts and/or magnesium salts, dehydrating the washed minced fish meat, adding surface active agents for food and/or fatty compounds for food to the washed dehydrated minced fish meat after dehydration, freezing the dehydrated minced fish meat to give surimi, and then freezing the surimi.

Most surimi based products, such as kamaboko (fish cake), are produced from frozen surimi. The frozen surimi is prepared in a manner such that raw fish meat, of which insides, head, bones, skin, caudal rays, scale and the like are removed, is passed through a roll-type separator to obtain minced fish meat. The minced fish meat is washed with water, dehydrated by, for example, a screw press, and then suitable additives, such as sugars, sodium chloride, polyphosphate and the like, are added with mixing. The mixture is then kept in a refrigerator.

In the washing process sometimes fresh water is used, but in general fresh water is unacceptable. This is because an insufficient amount of water can be removed from the minced fish meat which has been washed with fresh water, giving dehydrated raw surimi rich in water. Therefore, sodium chloride is added to the wash water. The sodium chloride solution has a mild action such that the dehydration ratio is not influenced by the kinds of fish meat, quality, and freshness, but it is deficient in the yield of the fish meat proteins, as stated hereinbefore. However, conventional washing processes are practiced using water containing sodium chloride.

According to the present invention the minced fish meat is washed with water containing calcium salts and/or magnesium salts. The calcium salts or magnesium salts are preferable as additives for the washing water, because they promote dehydration as well as control the release of myofibrillar proteins to give a high yield of the fish protein. However, as a result they are liable to harden the surimi based product obtained. Since the level of dehydration is remarkably changed according to the amount of calcium salts and magnesium salts, kinds of fish meat, quality and freshness, so as to make it difficult to control the dehydration level, alkaline metal salts may be used together with the above calcium salts and/or magnesium salts.

According to the present invention calcium salts and/or magnesium salts may be used in a range of an ion strength ($\mu$) of 0.0025–0.05, and therefore any such salts giving an ion strength ($\mu$) of more than 0.0025 can be used. Preferred salts are halogenized compounds, especially chlorides, sulfates, nitrates, acetates, lactates and the like.

The ion strength as described hereinbefore is represented by the following equation:

$$\mu = (\Sigma r \times Z^2)/2$$

wherein r is a molar concentration of a given ion, and Z is the atomic value of the ion.

For example, in the case of $MgCl_2$, the $\mu$ value at a one molar concentration is:

$$\mu = \tfrac{1}{2} \times (1 \times 2^2 + 2 \times 1^2) = 3$$

The weight percent of calcium salts or magnesium salts within the range of a $\mu$ value of 0.0025–0.05 corresponds to, for example, 0.012–0.25% $CaCl_2$, and 0.015–0.33% $MgCl_2.6H_2O$.

Alkaline metal salts, which may be used together with calcium salts or magnesium salts, may include halogenized compounds, nitrates, carbonates, bicarbonates, phosphates, or organic acid salts. A mixture of the above compounds may be used. These salts (calcium salts, magnesium salts and alkaline metal salts) may be used within a total ion strength of 0.0025–0.05, which means that NaCl may be used at an ion strength ($\mu$) of not more than 0.03 if $CaCl_2$ is used at an ion strength ($\mu$) of 0.02, when both salts are used together.

The washed minced fish meat is then dehydrated, generally to 80–90% by weight of water, preferably to 82–88% by weight. Dehydrated minced fish meat containing water of less than 80% by weight gives a crunchy surimi based product deficient in elasticity.

To the dehydrated minced fish meat any conventional additives, such as sugars, sugar alcohols, polyphosphates and the like, may be blended. Further, sodium chloride may be added in order to make a salt-containing surimi. In the present invention surface active agents for foot and/or fatty compounds such as glycerides are added.

Preferred surface active agents for food are mono- or diglycerides, sugar esters, sorbitan fatty acid esters, propylene glycol fatty acid esters, lecithin, polyoxyethylene sorbitan fatty acid esters, and mixtures thereof.

The amount of the surface active agents to be incorporated into the dehydrated minced fish meat may be preferably 0.05–1.0% by weight of the total amount of the surimi, more preferably about 0.1 to 0.5% by weight. The amount of the surface active agents may be determined according to the kind of fish meat, the ratio of dehydration of dehydrated minced fish meat, hardness and the like. The effect of the present invention can not be generally achieved at concentrations of surface active agents less than 0.05% by weight, and increased effectiveness can not be expected if concentrations more than 1.0% by weight are used.

The surface active agents for food may be used alone or mixed with fatty compounds.

The surface active agents or their mixtures with fatty compounds may be preferably used as a dispersion in sugars or sugar alcohols.

However, they may be used as an O/W type emulsion, a solution or suspension in eatable solvents such as ethanol, propyleneglycol and the like. In short, these additives may be added in such a manner than the surface active agents and/or fatty compounds can be promptly dispersed into the dehydrated minced fish meat.

Suitable sugars or sugar alcohols include glucose, maltose, sugar, lactose, maltitol, sorbitol, dextran, and the like.

Fatty compounds of the present invention may include fats (triglycerides of fatty acid) and waxes (higher fatty acid esters of higher alcohols), but the former is more preferable. Examples of fatty compounds include vegetable oils, such as rapeseed oil, soybean oil, cotton oil, rice bran oil, corn oil, palm oil, olive oil, and peanut oil, and animal oil such as tallow oil, lard and fish oil.

The surface active agents or their combination with fatty compounds give a suitable hardness and elasticity to the fish meat which was washed with an aqueous solution of calcium salts or magnesium salts. Therefore, according to the present invention, it is possible to use an aqueous solution of calcium of magnesium salts, which had not been previously used as a washing solution to improve production efficiency. In addition, the method gives frozen surimi which is suitable for making surimi based products having an excellent crunch.

Into the frozen surimi of the present invention polyphosphates, alkaline metal carbonates, alkaline metal salts of organic carboxylic acids, such as citric acid, tartaric acid, malonic acid and the like, may be added.

The frozen minced surimi may be salt-free surimi, salt-containing surimi, phosphate-free surimi or phosphate-containing surimi, into which any other additives may be added.

Fishes usable in the present invention include Walleye pollack, Atka mackerel, Sardine, Mackerel, Saury pike, Hairtail pike eels, Flatfish, Horse mackerel, Melusa and the like, but usable fish are not thereby restricted, and mixtures thereof may be used.

The present invention is illustrated by the following Examples, which are presented by way of illustration and not of limitation.

EXAMPLE 1

Fresh Walleye pollack obtained the previous day is placed in cold-storage in a stock tank for one night. The fish is cut up as usual into dress, which is then washed with a rotary drum-type washing machine and pressed through a roll-type separator to obtain minced fish meat. This minced fish meat is placed in the first washing tank, washed with 3 to 4 times its weight of water, and dehydrated on a rotary sieve. After repeating this washing/dehydrating cycle two times, the minced fish meat is placed in the second washing tank, dehydrated on a rotary sieve without adding sodium chloride, and passed through a refiner to remove black skins, tendon, dark colored meat and the like. The washed minced fish meat obtained is referred to as "fish meat from refiner" hereinafter. The fish meat from refiner is stirred and mixed in a mixer so that its water distribution is uniform, and then is divided into two groups of 70 kg each. The water content of this fish meat from refiner is 94.2%. Each group of the fish meat from refiner (70 kg) is charged into separate washing tanks. An aqueous solution (140 liter: two times the amount of the fish meat from refiner) of magnesium chloride or calcium chloride, having an ion strength (referred to as I.S. hereinafter) as shown in Table 1, is added into the washing tanks. The groups are separately mixed for 5 minutes, dehydrated in a rotary sieve and then dehydrated by a small screw press at the same revolution (notch: 0.4). The two groups of dehydrated minced fish meat are then divided into three subgroups of 5 kg. Each subgroup is treated as follows:

(1) To the dehydrated minced fish meat of the first subgroup, sugar (1%), sorbitol powder (5%) and polyphosphates (0.2%) (a mixture of sodium polyphosphate (50%) and sodium pyrophosphate (50%); the simple expression "polyphosphates" means this mixture throughout the Examples unless otherwise indicated) are added. The fish meat and additives are then mixed with a small silent cutter for 5 minutes. This mixing treatment is referred to as "control".

(2) To the dehydrated minced fish meat of the second subgroup, sugar (1%), Reagent A (5%) and polyphosphates (0.2%) are added and mixed as in the above process (1).

Reagent A: Sorbitol powder (360 g) is heated to 100° to 105° C. to give a molten liquid, to which commercially available monoglyceride derived from cotton oil (25 g) and sorbitan monostearate (25 g) are added. The solution is mixed to give a roughly homogenous mixture, and then violently mixed to form a homogenous dispersion. To the dispersion additional sorbitol powder (90 g) is added as a seed for crystallization. The preparation is mixed, cooled to room temperature and then held for one day to form crystals. The resultant mixture is ground and passed through a sieve of 20 mesh, to give Reagent A consisting of sorbitol (90%), glycerin fatty acid ester (5%) and sorbitan monostearate (5%).

(3) To the dehydrated minced fish meat of the third subgroup, sugar (1%), a mixture of sorbitan monooleate and sorbitol powder (5.5%) (sorbitan monooleate (0.5%) and sorbitol powder (5) and polyphosphate (0.2%) are added, mixed and treated as in process (1).

The obtained minced fish meat containing additives (surimi) is frozen at −30° C. by an air blast freezer. It takes 3-5 hours for freezing. One day after freezing the obtained frozen surimi is thawed. Sodium chloride (3%) and potato starch (5%) are added per 2 kg of the surimi, mixed for 13 minutes with a small silent cutter, and then stuffed into a casing of polyvinylidene chloride. The stuffed material is heated in hot water at 90° C. for 30 minutes to produce a kamaboko (fish cake).

The yields of dehydrated minced fish meat, minced surimi and kamaboko, and the weight of solid and water content thereof, are shown in Table 1.

The Hunter whiteness and the elasticity of kamaboko is shown in Table 2. The whiteness of the surimi and kamaboko and the elasticity of the kamaboko are determined by the following methods:

Hunter whiteness: The Hunter whiteness of the surimi and the kamaboko is determined by the Hunter color difference meter (ND-101DP available from NIPPON DENSHOKU KOGYO K.K.).

Sensory test: Elasticity (ashi) is tested according to the 10-grade method (10, very strong; 5, common; 1, very weak) using 6 panels, and is expressed by the mean value of the marks of 6 panels.

Mechanical test: The mechanical test is carried out with a food rheometer (produced by Fudo Kogyo K.K.) using a spherical plunger 5 mm in diameter. W (g): load at the time of breaking. L (cm): length of intrusion (depth of hollow) of the plunger at the time of breaking. L indicates mainly softness and flexibility. W×L (g×cm) represents jelly elasticity of the kamaboko.

TABLE 1

| test washing process | yield | | | | percent of water in dehydrated minced fish meat (%) ((c−d)/c) |
|---|---|---|---|---|---|
| | dehydrated minced fish meat | | dehydrated minced fish meat (solid) | | |
| | weight (kg) (c) | ratio (%) (c/a*) | weight (kg) (d) | ratio (%) (d/b*) | |
| MgCl₂ I.S. = 0.05 | 15.9 | 22.7 | 3.1 | 75.6 | 80.5 |
| CaCl₂ I.S. = 0.05 | 15.7 | 22.4 | 3.1 | 75.6 | 80.3 | a*: the amount of the fish meat from refiner (70 kg).
b*: the solid weight of the fish meat from refiner (4.1 kg).

TABLE 2

| groups and subgroups | | water content (%) | | Hunter whiteness | | elasticity of kamaboko | | mechanical test W(g) × L(cm) jelly strength |
|---|---|---|---|---|---|---|---|---|
| washing dehydrating | mixing | surimi | kamaboko | surimi | kamaboko | sensory test strength (ashi) | hardness | |
| MgCl₂ I.S. = 0.05 | Control* (1) | 76.0 | 70.4 | 18.3 | 39.6 | (7.0)** | (7.8)** | 680 × 1.00 (680 cm · g) |
| | Treatment* (2) | 75.8 | 70.2 | 25.7 | 42.1 | 7.2 | 7.0 | 580 × 1.20 (696) |
| | Treatment* (3) | 75.8 | 70.2 | 25.3 | 41.8 | 7.1 | 7.1 | 575 × 1.18 (679) |
| CaCl₂ I.S. = 0.05 | Control (1) | 75.9 | 70.3 | 18.2 | 39.5 | (7.0)** | (7.9)** | 690 × 0.99 (683) |
| | Treatment (2) | 75.7 | 70.1 | 25.7 | 42.0 | 7.1 | 7.0 | 593 × 1.18 (700) |
| | Treatment (3) | 75.8 | 70.1 | 25.4 | 41.7 | 7.0 | 7.1 | 585 × 1.16 (679) |

*the treatment numbers (1), (2) and (3) as aforementioned.
**too hard to eat as a kamaboko.

As apparent from Table 1, the ratio of dehydration can be extremely improved by dehydration under ordinary conditions after the minced fish meat is washed with an aqueous solution of magnesium chloride (IS=0.05) or calcium chloride (IS=0.05). By this method, the water content of the dehydrated minced fish meat can be reduced to 80%. Table 2 shows that the kamaboko of (1) (control) produced from frozen surimi washed with magnesium chloride or calcium chloride has a significantly lower content of water, due to the strong dehydrating action of the magnesium chloride or calcium chloride. This kamaboko becomes so rigid and inflexible that it is unpalatable, due to the strong binding action of these salts with protein. The mechanical data of control (1) show that the L (cm) value (indicating softness) is comparatively small in spite of the W (g) value (influencing hardness) being large. Thus, the process of control (1) gives rise to surimi of rigid quality.

On the other hand, the use of surface active agents in addition to the wash with an aqueous solution of magnesium chloride or calcium chloride, i.e., treatments (2) and (3), gives an excellent kamaboko without excessive rigidity as compared with the control (1).

It can be seen from the above results that frozen surimi which is washed with an aqueous solution of magnesium of calcium salts is not suitable as a starting material for production of kamaboko without additional treatments. However, it can be used as the starting material if surface active agents or fatty compounds are added in the mixing process.

EXAMPLE 2

Washing and dehydrating processes are repeated two times in the same manner as in Example 1. The dehydrated minced fish meat of walleye pollack is collected and mixed by a mixer, so as to homogenously disperse the water in the meat. The mixed minced fish meat contains water at 91.4% and is divided into two groups of 100 kg each. An aqueous solution of NaCl (control) or of NaCl plus $CaCl_2$ (Examples) (200 liter: two times the amount of minced fish meat), the ion strength of which is indicated in Table 3, is charged in a washing tank, respectively, to which each group of fish meat (100 kg) is added. The fish meat and additives are mixed for five minutes, dehydrated by a rotary sieve, and then black skin, tendon, and dark colored meat are removed through a small refiner. The obtained minced fish meat from refiner is dehydrated by a small screw press under the same revolution (notch 0.5) to give the dehydrated minced fish meat of each group. The dehydrated minced fish meat of each group is then divided to 6 subgroups of 6 kg each and is mixed under the following conditions:

(4) To the dehydrated minced fish meat of the first subgroup, sorbitol powder (6%) and polyphosphates (0.2%) are added, and the material is then mixed by a small silent cutter for 5 minutes. This mixing treatment is referred to as a control.

(5) To the dehydrated minced fish meat of the second subgroup, Reagent B (6%) and polyphosphates (0.2%) are added and mixed in the same manner as in (4).

(6) To the dehydrated minced fish meat of the third subgroup, Reagent C (6%) and polyphosphates (0.2%) are added and mixed in the same manner as in (4).

(7) To the dehydrated minced fish meat of the fourth subgroup, Reagent D (5%), sorbitol powder (1%) and polyphosphates (0.2%) are added and mixed in the same manner as in (4).

(8) to the dydrated minced fish meat of the fifth subgroup, Reagent E (3%), sorbitol powder (3%) and polyphosphates (0.2%) are added and mixed in the same manner as in (4).

(9) To the dehydrated minced fish meat of the sixth subgroup, Reagent F (3%), sorbitol powder (3%) and polyphosphates (0.2%) are added and mixed in the same manner as in (4) to give surimi.

The obtained surimi is frozen at $-30°$ C. by an air blast freezer, and then thawed at room temperature ($10°–15°$ C.). Kamabokos were produced from the surimi in the same manner as in Example 1.

The yield of dehydrated minced fish meat is shown in Table 3, and the Hunter whiteness and elasticity are shown in Table 4. The Reagents B, C, D, E and F, containing surface active agents and used in the above processes, are prepared according to the following methods:

Reagent B: Sorbitol powder (400 g) is melted at $100°–105°$ C. to give a melted liquid, to which commercially available monoglycerides (25 g) derived from cotton oil are added. The solution is mixed to give a roughly uniform dispersion, and then violently stirred by a homomixer to thoroughly dispersed. To the resultant dispersion, additional sorbitol powder (75 g) is added as a seed for crystallization. The preparation is mixed, cooled at room temperature, and then kept for one day to allow formation of crystals. The crystals are ground and passed through a sieve of 24 mesh to give a powdery Reagent B, which contains sorbitol (95%) and monoglycerides (5%).

Reagent C: Sorbitol liquid (70%, 100 g) is heated at $50°$ C., and a mixture of oleoyl monoglyceride (10 g) and sorbitan monolaurate (15g) is added after the mixture reaches $50°$ C. The resultant mixture is dispersed by a homomixer. The dispersing liquid is homogenously mixed with sorbitol powder (405 g) and passed through a sieve of 80 mesh to give a powdery product. This product is dried, ground, and then passed through a sieve of 20 mesh to give the powdery Reagent C, which contains sorbitol (95%), monoglycerides (2%) and sorbitan monolaurate (3%).

Reagent D: Sorbitol powder (420 g) is heated to $100°–105°$ C. to cause melting, and a commercially available sugar fatty acid ester (HLB 15, 10 g) is added and then dissolved. To the resultant mixture, rapeseed oil (20 g) heated to about $80°$ C. is added and dispersed with a homomixer. After the resultant liquid is cooled to $80°–85°$ C., additional sorbitol powder (50 g) is added as a seed for crystallization. The preparation is mixed, cooled at room temperature, and kept for one day to allow formation of crystals. After grinding, the crystals are passed through a sieve of 32 mesh to give the powdery Reagent D, consisting of sorbitol (94%), sugar fatty acid ester (2%) and rapeseed oil (4%).

Reagent E: Sorbitan monooleate (50 g) is added little by little to sorbitol powder (450 g) which is passed through a sieve of 20 mesh during mixing. After storage at $40°$ C. for 2 days, the mixture is lightly ground and passed through a sieve of 20 mesh to give the powdery Reagent E, consisting of sorbitol (90%) and sorbitan monooleate (10%).

Reagent F: Sorbitol powder (350 g) is heated to $100°–105°$ C. to cause melting. A preparation of polypropylene glycol stearate (20 g), polyoxyethylene sorbitan monostearate (Tween 60, 15 g), cotton seed oil (10 g) and lecithin (5 g) is mixed and heated to cause melting. This melted preparation is added to the melted sorbitol, and is violently stirred with a homomixer to disperse. The dispersion is cooled to 80° C.-90° C., and sorbitol powder (100 g) is added as a seed for crystallization. The seeded dispersion is then mixed, cooled and kept for one day to allow formation of crystals. The resultant product is ground to give the powdery Reagent F, consisting of sorbitol (90%), propylene glycol stearate (4%), polyoxyethylene sorbitan monostearate (3%), cotton seed oil (2%) and lecithin (1%).

TABLE 3

| test washing process | yield | | | | percent of water in dehydrated minced fish meat ((c-d)/c) |
|---|---|---|---|---|---|
| | dehydrated minced fish meat | | dehydrated minced fish meat (solid) | | |
| | weight (kg) (c) | ratio (%) (c/a*) | weight (kg) (d) | ratio (%) (d/b*) | |
| NaCl (control) I.S. = 0.05 | 42.8 | 42.8 | 6.5 | 75.6 | 84.7 |
| NaCl I.S. = 0.04 CaCl₂ I.S. = 0.01 | 40.5 | 40.5 | 6.8 | 79.1 | 83.3 | a*: 100 kg of fish meat from refiner which was washed two times and passed through a sieve.
b*: 8.6 kg of solid of fish meat from refiner which was washed two times and passed through a sieve.

EXAMPLE 3

Minced fish meat is prepared in the same manner as in Example 1. The preparation is homogeneously mixed by homomixer to control the water content, passed through a refiner, and divided into three groups of 80 kg each. The water content of the minced fish meat from the refiner is 93.9%. Each group of the divided minced fish meat (80 kg) is combined with 160 liters of NaCl solution (Group 1) or with an aqueous solution for dehydration (NaCl 70%; $MgCl_2 \cdot 6H_2O$ 29%; $NaHCO_3$ 1%), as shown in Table 5. Each group is mixed for 5 minutes and dehydrated by a rotary sieve. The two groups mixed with the dehydrated reagent are then dehydrated by a small screw press set at two different revolutions (notch shown in Table 5), giving two groups of dehydrated minced fish meat. Ten kg of the dehydrated minced fish meat of each group is divided into two subgroups and mixed as follows:

(10) To the dehydrated minced fish meat of the first subgroup, sugar (4%), sorbitol powder (4%) and polyphosphate (0.3%) are added, and the preparation is mixed for ten minutes by a grinder (control).

(11) To the dehydrated minced fish meat of the second subgroup, sugar (4%) and Reagent G (4.6%) are added and mixed as in (10).

Reagent G: Sorbitol powder (350 g) is melted at

TABLE 4

| groups and subgroups | | water content (%) | | Hunter whiteness | | elasticity of kamaboko | | |
|---|---|---|---|---|---|---|---|---|
| | | | | | | sensory test | | mechanical test |
| washing dehydrating | mixing | surimi | kamaboko | surimi | kamaboko | strength (ashi) | hardness | W(g) × L(cm) jelly strength |
| NaCl I.S. = 0.05 | Control (4)* | 78.3 | 73.4 | 19.6 | 42.3 | 5.4 | 5.6 | 415 |
| | Reagent B (5)* | 78.1 | 73.3 | 25.4 | 43.8 | 5.4 | 5.3 | 425 |
| | Reagent C (6)* | 78.1 | 73.4 | 25.6 | 43.6 | 5.4 | 5.3 | 420 |
| | Reagent D (7)* | 78.2 | 73.2 | 31.9 | 42.7 | 5.3 | 5.0 | 390 |
| | Reagent E (8)* | 78.1 | 73.3 | 25.6 | 42.8 | 5.4 | 5.4 | 420 |
| | Reagent F (9)* | 78.1 | 73.1 | 25.3 | 42.8 | 5.3 | 5.3 | 410 |
| NaCl I.S. = 0.04 CaCl₂ I.S. = 0.01 | Control (4) | 77.4 | 72.6 | 19.8 | 41.8 | 5.9 | 6.0 | 480 |
| | Reagent B (5) | 77.3 | 72.5 | 25.8 | 43.6 | 6.0 | 5.6 | 495 |
| | Reagent C (6) | 77.2 | 72.4 | 26.0 | 43.2 | 5.9 | 5.7 | 490 |
| | Reagent D (7) | 77.2 | 72.5 | 31.3 | 42.8 | 5.8 | 5.3 | 460 |
| | Reagent E (8) | 77.3 | 72.4 | 25.8 | 42.5 | 5.9 | 5.7 | 490 |
| | Reagent F (9) | 77.2 | 72.4 | 25.6 | 42.5 | 5.9 | 5.7 | 480 |

*prepared according to mixing processes (4)–(9) as aforementioned.

As shown in Table 3, if minced fish meat from refiner is dehydrated after washing with an aqueous solution of NaCl plus $CaCl_2$, the yield of solid of dehydrated minced fish meat and the dehydration are improved in comparison with the control (dehydration by water containing NaCl alone). Further, Table 4 shows that kamaboko having elasticity with rigidity is obtained, if water containing NaCl plus $CaCl_2$ is used in the washing process. If during the mixing process surface active agents are added to the dehydrated minced fish meat (washed with water containing NaCl plus $CaCla_2$), a kamaboko having elasticity with softness is obtained.

about 105° C., and commercially available monoglycerides derived form cotton seed oil (32.5 g) are added and dissolved. The solution is then sufficiently dispersed by a homomixer. After the dispersed liquid is cooled to about 85° C., a mixture of sorbitol powder (85 g) and polyphosphates (32.5 g) is added to the liquid. The preparation is mixed, cooled at room temperature, and then held for one day to allow formation of crystals. The crystals are powdered and passed through a sieve of 24 mesh to give the powdery Reagent G, consisting of sorbitol powder (87.0%), monoglycerides from cotton seed oil (6.5%) and polyphosphates (6.5%).

The resultant surimi is frozen at −30° C. by an air blast freezer, defrosted at 10°-15° C. one month after freezing, and then a kamaboko is prepared and tested according to Example 1. The dehydration time and yield of the dehydrated minced fish meat are shown in Table 5; the whiteness of the surimi and the kamaboko, and the elasticity of the kamaboko are shown in Table 6.

TABLE 5

| washing process | dehydration process | | yield | | | | percent of water in dehydrated minced fish meat (%) ((c-d)/c) |
|---|---|---|---|---|---|---|---|
| | screw press (notch) | dehydration time (minutes) | dehydrated minced fish meat | | dehydrated meat fish meat (solid) | | |
| | | | weight (kg) (c) | ratio (%) (c/a*) | weight (kg) (d) | ratio (%) (d/b*) | |
| NaCl I.S. = 0.05 | 0.4 | 58 | 25.9 | 32.4 | 3.5 | 71.4 | 86.4 |
| Reagent for dehydration I.S. = 0.05 | 0.4 | 46 | 22.8 | 32.4 | 3.6 | 73.5 | 84.1 |
| Reagent for dehydration I.S. = 0.05 | 0.6 | 39 | 27.1 | 33.9 | 3.7 | 75.5 | 86.2 | a*: the amount of the fish meat from refiner being 80 kg.
b*: the solid weight of the fish meat from refiner being 4.9 kg.

The results presented in Table 5 may be summarized as follows:

If the revolution of the screw press is adjusted equal to that of Group 1, the dehydrating effect of the reagent is more pronounced and the dehydration time becomes short.

It is possible to loosely squeeze the washed minced fish meat by increasing the revolution of the screw press, in which case the dehydration effect decreases a little, but the dehydration time becomes even short. In other words, the reagents for dehydration according to the present invention are effective for making the dehydration effect larger, so as to improve the production efficiency.

The release of protein into the wash water upon dehydration is decreased, as evidenced by the higher yield of solid dehydrated minced fish meat.

As shown in Table 6, the kamaboko produced from surimi which is treated with wash water containing reagents of the present invention has elasticity with rigidity. However, if Reagent G containing surface active agents is added in the mixing process, surimi and kamaboko having excellent elasticity and improved softness and whiteness are obtained.

EXAMPLE 4

Minced fish meat is produced according to Example 1 and passed through a refiner. Fish meat containing homogeneously dispersed water is then divided into 7 groups of 60 kg each. The water content of the fish meat from the refiner is 94.0%. Each group of the fish meat (60 kg) is charged into washing tanks containing aqueous solutions (120 liter) of NaCl alone or NaCl in combination with $MgCl_2$, $CaCl_2$, $MgSO_4$ and/or $CaSO_4$ at the concentrations (ion strength) shown in Table 7. Each mixture in a washing tank is mixed for 5 minutes, dehydrated by a rotary sieve and then dehydrated by a small screw press at a constant revolution (notch 0.5), giving a dehydrated minced fish meat for each group.

Each group of dehydrated minced fish meat is then divided into two subgroups of 10 kg each, and mixed as follows:

(12) To one subgroup of the dehydrated minced fish meat, sugar (3%), sorbitol powder (3%), and polyphosphates (0.2%) are added, and the preparation is mixed by a small silent cutter for 5 minutes (control).

(13) To the other subgroup of the dehydrated minced fish meat, sugar (3%) and Reagent H are added, and the preparation is minced by a small silent cutter for 5 minutes.

Reagent H: This Reagent is prepared from sorbitol (83.3%), monoglyceride derived from cotton seed oil (10%), and polyphosphate (6.7%) in the same manner as Reagent G is prepared.

The resultant surimi is frozen by an air blast freezer and defrosted at room temperature (10° C.-15° C.) one month after freezing. Kamaboko is then produced according to the procedure in Example 1 in order to determine its properties. The yields and water contents of the dehydrated minced fish meat are shown in Table 7; whiteness of the surimi and kamaboko, and elasticity of the kamaboko are shown in Table 8.

TABLE 6

| groups and subgroups | | water content (%) | | Hunter whiteness | | elasticity of kamaboko | | |
|---|---|---|---|---|---|---|---|---|
| | | | | | | sensory test | | mechanical test |
| washing dehydrating | mixing | surimi | kamaboko | surimi | kamaboko | strength (ashi) | hardness | W(g) × L(cm) jelly strength |
| NaCl I.S. = 0.05 notch 0.4 | Control (10)* | 79.7 | 73.8 | 20.1 | 43.7 | 5.7 | 5.6 | 370 (g · cm) |
| | Reagent G (11)* | 79.6 | 73.7 | 25.7 | 44.9 | 5.7 | 5.3 | 375 |
| Reagent for dehydration I.S. = 0.05 notch 0.4 | Control (10) | 77.6 | 71.9 | 18.9 | 41.2 | 6.5 | 6.5 | 560 |
| | Reagent G (11) | 77.4 | 71.7 | 25.1 | 42.7 | 6.6 | 6.2 | 570 |
| Reagent for dehy- | Control (10) | 79.6 | 73.7 | 20.7 | 43.9 | 5.8 | 5.8 | 390 |

TABLE 6-continued

| groups and subgroups | | water content (%) | | Hunter whiteness | | elasticity of kamaboko | | |
|---|---|---|---|---|---|---|---|---|
| | | | | | | sensory test | | mechanical test |
| washing dehydrating | mixing | surimi | kamaboko | surimi | kamaboko | strength (ashi) | hardness | W(g) × L(cm) jelly strength |
| dration I.S. = 0.05 notch 0.6 | Reagent G (11) | 79.4 | 73.6 | 26.3 | 45.2 | 5.9 | 5.4 | 400 |

*prepared according to the mixing treatments (10) and (11) as aforementioned.

TABLE 7

| | yield | | | | percent of water in dehydrated minced fish meat (%) ((c−d)/c) |
|---|---|---|---|---|---|
| | dehydrated minced fish meat | | dehydrated minced fish meat (solid) | | |
| test washing process | weight (kg) (c) | ratio (%) (c/a*) | weight (kg) (d) | ratio (%) (d/b*) | |
| NaCl control I.S. = 0.05 | 17.1 | 28.8 | 2.1 | 58.3 | 87.5 |
| NaCl I.S. = 0.04 MgCl$_2$ I.S. = 0.01 | 15.1 | 25.2 | 2.4 | 66.7 | 84.4 |
| NaCl I.S. = 0.04 MgCl$_2$ I.S. = 0.005 CaCl$_2$ I.S. = 0.005 | 14.3 | 23.8 | 2.3 | 63.9 | 84.1 |
| NaCl I.S. = 0.04 CaCl$_2$ I.S. = 0.01 | 14.0 | 23.3 | 2.3 | 63.9 | 83.4 |
| NaCl I.S. = 0.04 MgSO$_4$ I.S. = 0.01 | 14.8 | 24.7 | 2.3 | 63.9 | 84.2 |
| NaCl I.S. = 0.04 MgSO$_4$ I.S. = 0.005 CaSO$_4$ I.S. = 0.005 | 14.4 | 24.0 | 2.3 | 63.9 | 84.0 |
| NaCl I.S. = 0.04 CaSO$_4$ I.S. = 0.01 | 13.7 | 22.8 | 2.2 | 61.1 | 83.8 | a*: the weight of the fish meat from refiner (60 kg).
b*: the solid weight of the fish meat from refiner (3.6 kg).

As shown in Table 7, if minced fish meat is washed with an aqueous solution of NaCl, MgCl$_2$ and/or CaCl$_2$, or with an aqueous solution of NaCl, MgSO$_4$ and or CaSO$_4$, and then dehydrated, the dehydration is more effective than that achieved with the control (NaCl alone), and the yield of solid of the dehydrated minced fish meat is improved. Further, it can be seen that the kamaboko which is produced using a washing solution of NaCl, MgCl$_2$, and/or CaCl$_2$, or a washing solution of NaCl, MgSO$_4$ and/or CaSO$_4$, has elasticity with rigidity. If Reagent H is added to the dehydrated minced fish meat at mixing, kamaboko having excellent elasticity with softness but no rigidity is obtained. In addition, the whiteness of the surimi and kamaboko is improved.

EXAMPLE 5

According to Example 1, minced fish meat of walleye pollack which has been washed and dehydrated two times is mixed with a mixer so that water is homogeneously dispersed, and is then divided into two groups of 80 kg each. The washed minced fish meat contains a water content of 91.5%. Each group of the washed minced fish meat (80 kg) is added into a washing tank containing an aqueous solution of either NaCl or NaCl plus MgCl$_2$ (160 liter), as described in Table 9, and then mixed for 5 minutes. After dehydration by a rotary sieve, the material is passed through a small refiner to remove black skin, dark colored meat and the like. The resultant minced fish meat from refiner is dehydrated by a small screw press at the same revolution (notch 0.4) to give fish meat of each group.

Each group of the fish meat is then divided into 6 subgroups of 5 kg each, and treated as follows:

(14) To the dehydrated minced fish meat of the first subgroup, sugar (3%), sorbitol powder (5%) and polyphosphates (0.3%) are added, and mixing is performed for 5 minutes by a small silent cutter.

(15) To the dehydrated minced fish meat of the second subgroup, sugar (4%), sorbitol powder (3.83%), Reagent I (0.17%) and polyphosphates (0.3%) are added, and mixing is performed for 5 minutes by a small silent cutter.

(16) To the dehydrated minced fish meat of the third subgroup, sugar (4%), sorbitol powder (3.67%), Reagent I (0.33%), and polyphosphates (0.3%) are added, and mixing is performed for 5 minutes by a small silent cutter.

(17) To the dehydrated minced fish meat of the fourth subgroup, sugar (4%), sorbitol powder (3%), Reagent I (1.0%) and polyphosphates (0.3%) are added, and mixing is performed for 5 minutes by a small silent cutter.

(18) To the dehydrated minced fish meat of the fifth subgroup, sugar (4%), sorbitol powder (2.33%), Reagent I (1.67%) and polyphosphates (0.3%) are added, and mixing is performed for 5 minutes by a small silent cutter.

(19) To the dehydrated minced fish meat of the sixth subgroup, sugar (4%), sorbitol powder (0.67%), Reagent I (3.33%) and polyphosphates (0.3%) are added, and mixing is performed for 5 minutes by a small silent cutter.

Reagent I is prepared by the following method:

Sorbitol powder is heated to 100°-105° C. to cause melting. A preparation of sorbitan monooleate (135 g) and cotton seed oil (15 g) is mixed and heated to cause melting. This melted preparation is added to the melted sorbitol, and is dispersed by violently stirring with a homomixer. The resultant liquid is cooled to 80°-90° C., and sorbitol powder (50 g) is added. The solution is mixed and then held at room temperature for one day to allow formation of crystals. After grinding, the crystals are passed through a sieve of 24 mesh to give the powdery Reagent I, consisting of sorbitol (70%), sorbitan monooleate (27%), and cotton seed oil (3%).

TABLE 8

| groups and subgroups | | water content (%) | | Hunter whiteness | | elasticity of kamaboko | | |
| --- | --- | --- | --- | --- | --- | --- | --- | --- |
| | | | | | | sensory test | | mechanical test |
| washing dehydrating | mixing | surimi | kamaboko | surimi | kamaboko | strength (ashi) | hardness | W(g) × L(cm) jelly strength |
| Control NaCl I.S. = 0.05 | Control (12)* | 82.4 | 76.3 | 22.0 | 43.5 | 5.5 | 5.5 | 340 (g · cm) |
| | Reagent H (13) | 82.3 | 76.2 | 26.5 | 45.6 | 5.5 | 5.5 | 345 |
| NaCl I.S. = 0.04 | Control (12) | 79.5 | 73.6 | 21.5 | 42.1 | 6.5 | 6.5 | 520 |
| MgCl₂ I.S. = 0.01 | Reagent H (13) | 79.3 | 73.5 | 26.3 | 43.4 | 6.6 | 6.3 | 530 |
| NaCl I.S. = 0.04 | Control (12) | 79.1 | 73.2 | 21.3 | 42.0 | 6.8 | 6.8 | 530 |
| MgCl₂ I.S. = 0.005 CaCl₂ I.S. = 0.005 | Reagent H (13) | 79.0 | 73.1 | 26.3 | 43.6 | 6.9 | 6.5 | 560 |
| NaCl I.S. = 0.04 | Control (12) | 78.7 | 72.8 | 21.0 | 41.7 | 7.0 | 7.0 | 565 |
| CaCl₂ I.S. = 0.01 | Reagent H (13) | 78.6 | 72.7 | 26.1 | 43.4 | 7.1 | 6.7 | 580 |
| NaCl I.S. = 0.04 | Control (12) | 79.2 | 73.3 | 21.4 | 42.0 | 6.5 | 6.5 | 510 (g · cm) |
| MgSO₄ I.S. = 0.01 | Reagent H (13) | 79.0 | 73.2 | 25.9 | 43.3 | 6.5 | 6.3 | 515 |
| NaCl I.S. = 0.04 | Control (12) | 79.1 | 73.2 | 21.2 | 42.1 | 6.8 | 6.7 | 520 |
| MgSO₄ I.S. = 0.005 CaSO₄ I.S. = 0.005 | Reagent H (13) | 78.9 | 73.2 | 26.3 | 43.5 | 6.8 | 6.6 | 545 |
| NaCl I.S. = 0.04 | Control (12) | 78.9 | 73.1 | 21.2 | 42.1 | 6.9 | 6.9 | 550 |
| CaSO₄ I.S. = 0.01 | Reagent H (13) | 78.8 | 72.9 | 26.1 | 43.4 | 7.0 | 6.6 | 570 |

*prepared according to mixing processes (12) and (13).

TABLE 9

| | yield | | | | percent of water in dehydrated minced fish meat (%) ((c−d)/c) |
| --- | --- | --- | --- | --- | --- |
| | dehydrated minced fish meat | | dehydrated minced fish meat (solid) | | |
| test washing process | weight (kg) (c) | ratio (%) (c/a*) | weight (kg) (d) | ratio (%) (d/b*) | |
| NaCl Control I.S. = 0.05 | 35.2 | 44.8 | 4.6 | 67.6 | 86.9 |
| NaCl I.S. = 0.03 | 31.4 | 39.8 | 5.2 | 76.5 | 83.9 |
| MgCl₂ I.S. = 0.02 | | | | | | a*: the amount of the fish meat from refiner (80 kg).
b*: the solid weight of the fish meat from refiner (6.8 kg).

TABLE 10

| groups and subgroups | | water content (%) | | Hunter whiteness | | elasticity of kamaboko | | |
| --- | --- | --- | --- | --- | --- | --- | --- | --- |
| | | | | | | sensory test | | mechanical test |
| washing dehydrating | mixing | surimi | kamaboko | surimi | kamaboko | strength (ashi) | hardness | W(g) × L(cm) jelly strength |
| NaCl I.S. = 0.05 | Control (14)* | 80.2 | 74.3 | 20.5 | 42.8 | 5.5 | 5.6 | 340 (cm g) |
| | oil 0.05% (15)* | 80.2 | 74.2 | 21.2 | 43.2 | 5.5 | 5.4 | 345 |
| | oil 0.1% (16)* | 80.2 | 74.3 | 22.2 | 43.9 | 5.5 | 5.4 | 350 |
| | oil 0.3% (17)* | 80.2 | 74.3 | 25.8 | 44.5 | 5.6 | 5.3 | 360 |
| | oil 0.5% (18)* | 80.2 | 74.1 | 28.0 | 45.3 | 5.6 | 5.1 | 360 |
| | oil 1.0% (19)* | 80.3 | 74.3 | 32.0 | 47.0 | 5.5 | 4.9 | 350 |
| NaCl I.S. = 0.03 MgCl₂ I.S. = 0.02 | Control (14) | 77.1 | 71.3 | 20.1 | 42.5 | 6.5 | 6.6 | 550 |
| | oil 0.05% (15) | 77.2 | 71.4 | 21.3 | 43.0 | 6.5 | 6.5 | 550 |
| | oil 0.1% (16) | 77.1 | 71.4 | 23.0 | 43.8 | 6.5 | 6.4 | 560 |
| | oil 0.3% | 77.2 | 71.3 | 25.6 | 44.2 | 6.6 | 6.3 | 570 |

TABLE 10-continued

| groups and subgroups | | water content (%) | | Hunter whiteness | | elasticity of kamaboko | | mechanical test |
| --- | --- | --- | --- | --- | --- | --- | --- | --- |
| washing dehydrating | mixing | surimi | kamaboko | surimi | kamaboko | sensory test strength (ashi) | hardness | W(g) × L(cm) jelly strength |
| | (17) oil 0.5% (18) | 77.1 | 71.2 | 27.9 | 45.1 | 6.5 | 6.0 | 570 |
| | oil 1.0% (19) | 77.0 | 71.4 | 31.8 | 46.8 | 6.5 | 5.8 | 560 |

*prepared according to mixing processes (14), (15), (16), (17), (18) and (19).

As seen from Table 9, if minced fish meat of walleye pollack is dehydrated after washing with an aqueous solution of NaCl and MgCl$_2$, the dehydration efficiency and yield of the dehydrated minced fish meat solid are improved as compared with the control (washed by NaCl solution). Further, it is shown in Table 10 that the addition of Reagent I containing surface active agents at mixing leads to excellent elasticity with softness and improved whiteness of the surimi and kamaboko.

EXAMPLE 6

Minced fish meat of Atka mackerel is washed and dehydrated two times as in Example 1. The fish meat is mixed by a mixer to disperse the water homogeneously, and is then divided into two groups of 60 kg each, of which the water content is 91.8%. Each group of the minced fish meat (60 kg) is respectively charged into two washing tanks containing aqueous solutions (120 liters each) of either NaCl alone or NaCl plus CaCl$_2$, at the concentrations (ion strength) shown in Table 11, and mixed for 5 minutes. After dehydration by a rotary sieve, each dehydrated minced fish meat is passed through a small refiner to remove the black skin, tendon, and dark colored meat. Each resultant minced fish meat from refiner is dehydrated by a screw press at the same revolution (notch 0.4), giving dehydrated meat in each group.

Each group of dehydrated minced fish meat is then divided into two subgroups of 10 kg each, which are then treated as follows:

(20) To the dehydrated minced fish meat of the first subgroup, sugar (3%), sorbitol powder (3%) and polyphosphates (0.2%) are added, and the preparation is mixed for ten minutes by a grinder to give surimi (control).

(21) To the dehydrated minced fish meat of the second subgroup, sugar (3%) and Reagent H (3%) are added, and the preparation is mixed for ten minutes by a grinder.

Reagent H is a powdery product containing sorbitol (83.3%), glycerin fatty acid ester (10%), and polyphosphates (6.7%), which is prepared in a similar manner as described above in Example (13).

The resultant surimi is frozen at −30° C. by an air blast freezer, thawed at room temperature (10°–15° C.), and then a kamaboko is produced and tested according to Example 1. The yields and water contents are shown in Table 11; the whiteness of the surimi and kamaboko, and the elasticity of the kamaboko are shown in Table 12.

TABLE 11

| | yield | | | | |
| --- | --- | --- | --- | --- | --- |
| | dehydrated minced fish meat | | dehydrated minced fish meat (solid) | | weight of dehydrated |
| test washing process | weight (kg) (c) | ratio (%) (c/a*) | weight (kg) (d) | ratio (%) (d/b*) | minced fish meat (%) ((c−d)/c) |
| NaCl Control I.S. = 0.05 | 26.3 | 43.8 | 3.6 | 73.5 | 86.2 |
| NaCl I.S. = 0.03 CaCl$_2$ I.S. = 0.02 | 22.9 | 38.2 | 3.9 | 79.6 | 82.9 | a*: the amount of the fish meat through the sieve after washing two times (60 kg).
b*: the solid weight of the fish meat through the sieve after washing two times (4.9 kg).

TABLE 12

| groups and subgroups | | water content (%) | | Hunter whiteness | | elasticity of kamaboko | | mechanical test |
| --- | --- | --- | --- | --- | --- | --- | --- | --- |
| washing dehydrating | mixing | surimi | kamaboko | surimi | kamaboko | sensory test strength (ashi) | hardness | W(g) × L(cm) jelly strength |
| NaCl I.S. = 0.05 | Control (20)* | 81.2 | 75.1 | 19.6 | 31.9 | 5.5 | 5.5 | 350 (cm · g) |
| | Reagent H (21)* | 81.0 | 74.9 | 23.8 | 33.0 | 5.5 | 5.2 | 355 |
| NaCl I.S. = 0.03 | Control (20) | 78.1 | 72.3 | 19.9 | 32.5 | 6.0 | 6.0 | 530 |
| CaCl$_2$ I.S. = 0.02 | Reagent H (21) | 78.0 | 72.1 | 24.4 | 33.6 | 6.1 | 5.6 | 550 |

*prepared according to mixing processes (20) and (21).

As can be seen in Table 11, if minced fish meat of Atka mackerel is dehydrated after washing with the aqueous solution of NaCl and CaCl$_2$, the dehydration efficiency and solid yield of the dehydrated minced fish meat are improved. Further, Table 12 shows that the addition of Reagent H during the mixing process apparently give surimi of excellent elasticity with softness, and additionally improves the whiteness of surimi and kamaboko.

What is claimed is:

1. A method of producing frozen surimi comprising:
   washing minced fish meat with a water solution, said solution containing one salt selected from the group consisting of calcium salts, magnesium salts and any combination thereof;

dehydrating the washed minced fish meat;
adding surface active agents to the dehydrated minced fish meat; and then
freezing the resultant surimi.

2. A method according to claim 1, wherein the surface active agents are selected from the group consisting of glycerin fatty acid esters, sugar fatty acid esters, sorbitan fatty acid esters, propylene glycol fatty acid esters, polyoxyethylene sorbitan fatty acid esters and mixtures thereof.

3. A method according to claim 1, wherein the ion strength ($\mu$) of the salt in the water solution is from 0.0025 to 0.05.

4. A method according to claim 1, wherein the calcium and magnesium salts are selected from the group consisting of chlorides, sulfates, nitrates, acetates, and lactates thereof.

5. A method according to claim 1, wherein the water solution additionally contains alkaline metal salts selected from the group consisting of chlorides, nitrates, carbonates, bicarbonates, phosphates, organic acid salts and mixtures thereof.

* * * * *